UNITED STATES PATENT OFFICE.

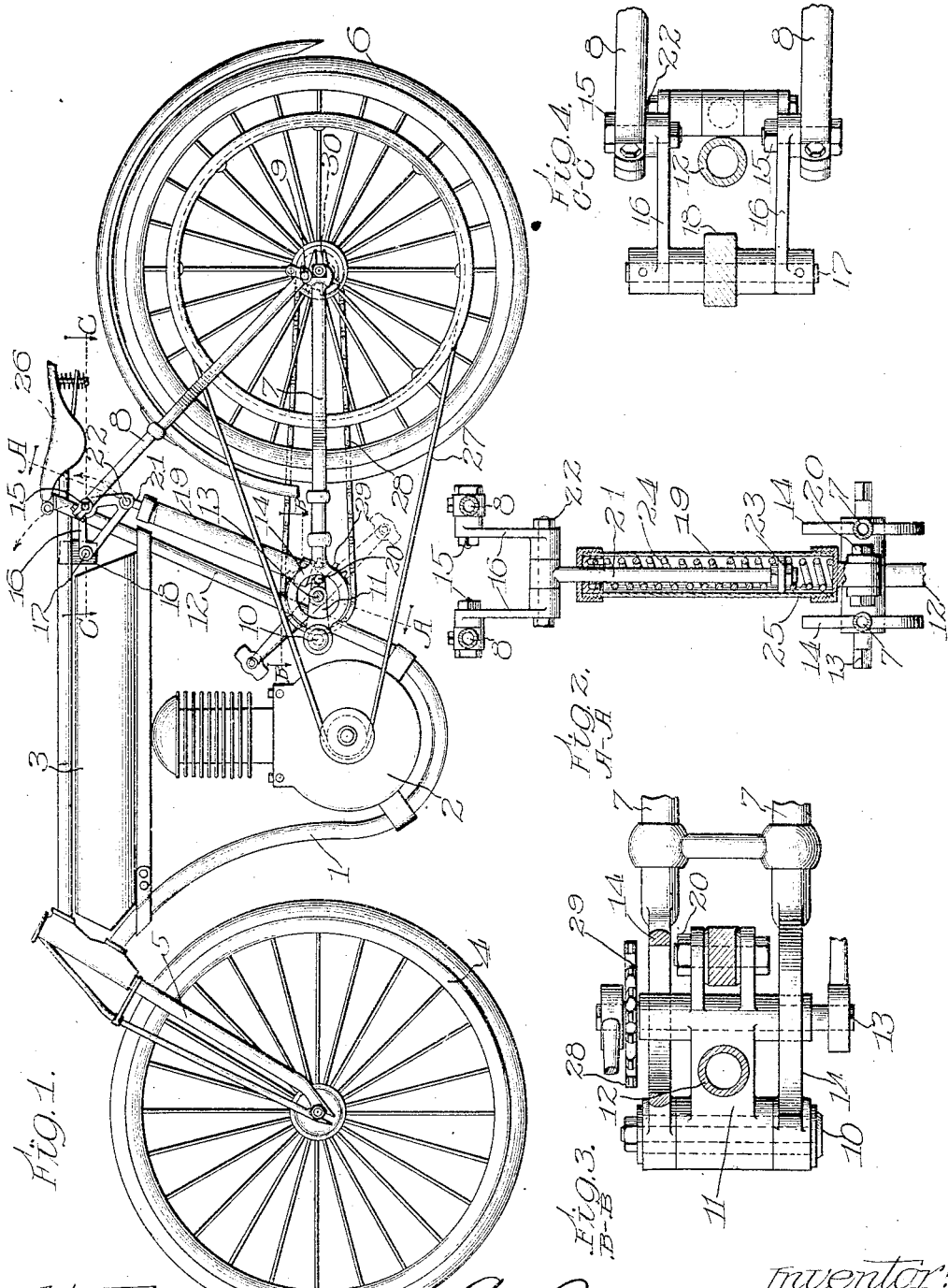

AMBROSE BENJAMIN ANZI, OF TRINIDAD, COLORADO.

SHOCK-ABSORBER FOR MOTOR-CYCLES.

1,039,684.  Specification of Letters Patent.  Patented Oct. 1, 1912.

Application filed May 31, 1911. Serial No. 630,497.

*To all whom it may concern:*

Be it known that I, AMBROSE BENJAMIN ANZI, a citizen of the United States of America, and a resident of Trinidad, county of Las Animas, State of Colorado, have invented certain new and useful Improvements in Shock-Absorbers for Motor-Cycles, of which the following is a specification.

The main objects of this invention are to provide an improved form of shock absorbing device for motorcycles and the like; and to provide improved means for mounting the shock absorbing device in the frame.

An illustrative embodiment of this invention is shown in the accompanying drawings, in which:—

Figure 1 is a side elevation of a motorcycle constructed according to this invention. Fig. 2 is an enlarged sectional detail, showing the shock absorbing device and its connection to the vehicle frame, as viewed from the plane of the line A—A of Fig. 1. Fig. 3 is an enlarged detail view of the frame adjacent to the pivotal connection between the two sections, as viewed from the plane of the line B—B of Fig. 1. Fig. 4 is an enlarged detail view of the lever and its connection to the two frame sections, as viewed from the plane of the line C—C of Fig. 1.

In the construction shown in the drawings, the front frame section 1 is of usual construction and supports the motor 2 and fuel tank 3, the front wheel 4 being carried by the fork 5. The rear wheel 6 is carried by a rear frame section or fork 7 pivoted to the front section 1. An angularly disposed brace or fork 8 is pivotally connected at 9 to the fork 7 and connected to the front frame by a link or lever hereinafter described.

The rear fork 7 is pivotally connected at 10 to a fitting 11 which is rigidly secured to the rear upright post 12 of the frame section 1. The fitting 11 also forms the bearing for the crank shaft 13. The fork 7 is looped at 14 near its forward end so as to avoid interfering with the crank shaft and insure free pivotal movement at the joint 10.

The fork 8 is pivotally connected at 15 to a link 16, comprising spaced triangular plates, which are in turn pivotally connected at 17 to a lug 18 depending from the upper horizontal bar of the frame section 1. These plates are located at opposite sides of the frame section 1 and connected between their ends to the fork 8, and together with the fork 8, serve as a toggle brace between the fork 8 and the frame section 1. The plates 16 are extended downwardly and rearwardly of their connection to the fork 8 so as to provide a lever arm to which the shock absorber may be connected.

The shock absorber comprises a cylinder 18 closed at both ends and pivotally connected at 20 to the fitting 11 near and rearward of the crank hanger bearing. A rod 21 extends through one end of the cylinder 19 and its upper end is pivotally connected at 22 between the lower ends of the plates 16. A washer or piston 23 is secured to the inner end of the rod 21 and its movement in either direction is yieldingly resisted by compression springs 24 and 25, which are interposed between the piston 23 and the respective ends of the cylinder 19. The upper spring 24, by means of the lever plates 16 and their connection to the frame section, supports the weight of the rider on the seat 26, and absorbs the shock incurred through travel of the vehicle over a rough road. The spring 25 serves as a buffer for cushioning the recoil of the spring 24. The action of the load carried between the wheels is to cause the rear fork 7 to swing upward, buckling the toggle brace 8, 16, and this buckling is resisted by the spring 24.

The motor 2 is connected to drive the rear wheel by means of the belt 27. The vehicle may also be manually propelled as usual through the medium of the sprocket chain 28 connecting the crank sprocket 29 with the sprocket 30 on the rear wheel.

When the rider is in position on the seat 26, he is in effect yieldingly supported on the spring 24 by virtue of the connection of the frame section 1 and shock absorber to the lever plates 16. During travel of the vehicle over a rough road, the rider is not subjected to severe shocks, these being absorbed by the shock absorber. If the front wheel strikes an abrupt elevation in the roadbed, the wheel will be elevated, whereupon the forward end of the frame section 1 will tend to swing upwardly about the pivot 10. Power will thereby be applied to the links 16 at 17, which will swing about the fulcrum 15 and be resisted by the compression of the spring 24. If the rear wheel 6 should strike an abrupt elevation in the roadbed, the fork 7 will swing upwardly about its pivot 10, and cause the brace 8 to apply power to the links 16 at 15, which will then swing upward about their fulcrum 17 and again the movement becomes resisted by the spring 24. When the piston recedes to its normal position, the force of the spring 24 is cushioned by the spring 25.

Although but one specific embodiment of this invention is herein shown and described, it will be understood that numerous details of the construction shown may be altered or omitted without departing from the spirit of this invention, as defined by the following claims.

I claim:—

1. In a vehicle, the combination of a frame; a seat support thereon; a crank hanger mounted on said frame in fixed relation to said seat support, a rear frame member pivotally connected to said frame adjacent to and in front of said hanger; and a resilient member interposed between said frame and frame member and adapted to yieldingly resist the pivotal movement of said rear frame member.

2. In a vehicle, the combination of a frame; a seat support thereon; a crank hanger mounted on said frame in fixed relation to said seat support; a rear frame member pivotally connected to said frame adjacent to and in front of said hanger, said member being looped adjacent to said crank hanger to provide an opening through which the crank may extend without preventing relative movement of said rear frame member and crank hanger; and a resilient member interposed between said frame and frame member and adapted to yieldingly resist the pivotal movement of said rear frame member.

Signed at Chicago this 25th day of May 1911.

AMBROSE BENJAMIN ANZI.

Witnesses:
EUGENE A. RUMMLER,
EDWIN PHELPS.

Copies of this patent may be obtained for five cents each, by addressing the "Commissioner of Patents, Washington, D. C."